United States Patent [19]
Ito et al.

[11] Patent Number: 5,828,841
[45] Date of Patent: Oct. 27, 1998

[54] VIDEO SIGNAL RECORDING AND REPRODUCTION APPARATUS

[75] Inventors: Norikazu Ito; Hiroyuki Fujita; Yuichi Kojima; Atsuo Matsuyama; Masahiro Kato, all of Kanagawa, Japan

[73] Assignee: Sony Corporation, Tokyo, Japan

[21] Appl. No.: 548,954

[22] Filed: Oct. 27, 1995

[30] Foreign Application Priority Data

Oct. 31, 1994 [JP] Japan .................................. 6-266635
Feb. 17, 1995 [JP] Japan .................................. 7-029768

[51] Int. Cl.⁶ ..................................................... H04N 7/16

[52] U.S. Cl. .......................... 395/200.49; 348/6; 455/3.1; 399/4; 399/52

[58] Field of Search ......................... 395/200.09, 200.49, 395/200.48; 389/4, 52, 225; 348/6, 7, 12, 13; 455/3.1

[56] References Cited

U.S. PATENT DOCUMENTS

| | | | |
|---|---|---|---|
| 4,357,624 | 11/1982 | Greenberg | 386/4 X |
| 4,849,817 | 7/1989 | Short | 386/4 X |
| 5,644,674 | 7/1997 | Aihara et al. | 386/4 X |

*Primary Examiner*—Nathan J. Flynn
*Attorney, Agent, or Firm*—Frommer Lawrence & Haug LLP; William S. Frommer

[57] ABSTRACT

A video signal recording and reproduction apparatus, provided with at least one encoding apparatus for encoding an input video signal, at least one data storage apparatus for recording and reproducing a video signal encoded by the encoding apparatus, a line switching apparatus for selectively connecting the encoding apparatus and data storage apparatus or selectively connecting the data storage apparatus and an output line of the video signal; and a control apparatus for controlling the line switching apparatus and the data storage apparatus in accordance with a recording command or reproduction command.

15 Claims, 7 Drawing Sheets

VIDEO SIGNAL RECORDING AND REPRODUCTION APPARATUS

BACKGROUND OF THE INVENTION

1. Field of the Invention

The present invention relates to an apparatus for recording and reproducing a digital video signal, more particularly to a recording and reproduction apparatus provided with high-efficient encoding apparatuses and decoding apparatuses, disk and other data storage apparatuses, high speed data transmission media, line switching apparatuses, etc.

2. Description of the Related Art

In the past, in the preparation of a news video in a broadcasting station, for example, the original video data recorded by cameras etc. with built-in video tape recorders were kept separate from each other recorded on tape.

An editor would then play back the tapes on which the original video data were recorded as needed using a video tape player in the editing room and combine parts of several of the reproduced original video data on a separate tape so as to prepare the news video for the actual broadcast.

When managing original video data in the form of the tapes on which they are respectively recorded, however, in particular when using a large number of original video data to prepare a single news video, the work efficiency was poor when selecting the necessary parts from the large number of original video data. Further, it was necessary to bring the tapes on which the original video data were recorded from their place of storage to the editing room. Also, it was not easy for a number of editors to make use of the original video data at the same time.

Further, news videos prepared on tapes are generally carried to and loaded in a video tape player for transmission use or a cart machine in which it is built in. The management of the news videos at the transmission stage and the procedures when changing the order of transmission were not easy to perform efficiently and with a high reliability.

SUMMARY OF THE INVENTION

An object of the present invention is to provide a video signal recording and reproduction apparatus with few limitations as to the system size and expandability.

Another object of the present invention is to provide a video signal recording and reproduction apparatus which accurately synchronizes with an external synchronization signal.

Further, still another object of the present invention is to provide a video signal recording and reproduction apparatus which operates with a good response with respect to requests from an editing apparatus without being influenced by the transfer capability of the computer network.

To achieve the object of the present invention, the video signal recording and reproduction apparatus of the present invention is comprised of at least one encoding means for encoding an input video signal, at least one data storage means for recording and reproducing a video signal encoded by the encoding means, a line switching means for selectively connecting the encoding means and the data storage means or selectively connecting the data storage means and an output line of the video signal; and a control means for controlling the line switching means and the data storage means in accordance with a recording command or reproduction command.

To achieve another object of the present invention, in the present invention, the data storage means records and reproduces the data output from the encoding means in synchronization with a reference synchronization signal.

To achieve the still other object of the present invention, the video signal recording and reproduction apparatus of the present invention is provided with a plurality of data storage means in which video data corresponding to original data is recorded; an editing means for outputting to a computer network designation data designating data to be reproduced at the time of editing and for outputting to a transmission line different from the computer network control signals for controlling operations; a control means for receiving the designation data transmitted by the computer network and outputting a selection signal for selecting the data storage means in which the data to be reproduced is stored based on the designation data; and a switching means for supplying to the selected data storage apparatus the control signals transmitted over the transmission line based on the selection signal supplied from the control means.

BRIEF DESCRIPTION OF THE DRAWINGS

These and other objects and features of the present invention will become more apparent from the following description of the preferred embodiments given with reference to the attached drawings, wherein.

DESCRIPTION OF THE PREFERRED EMBODIMENTS

Figure 1:
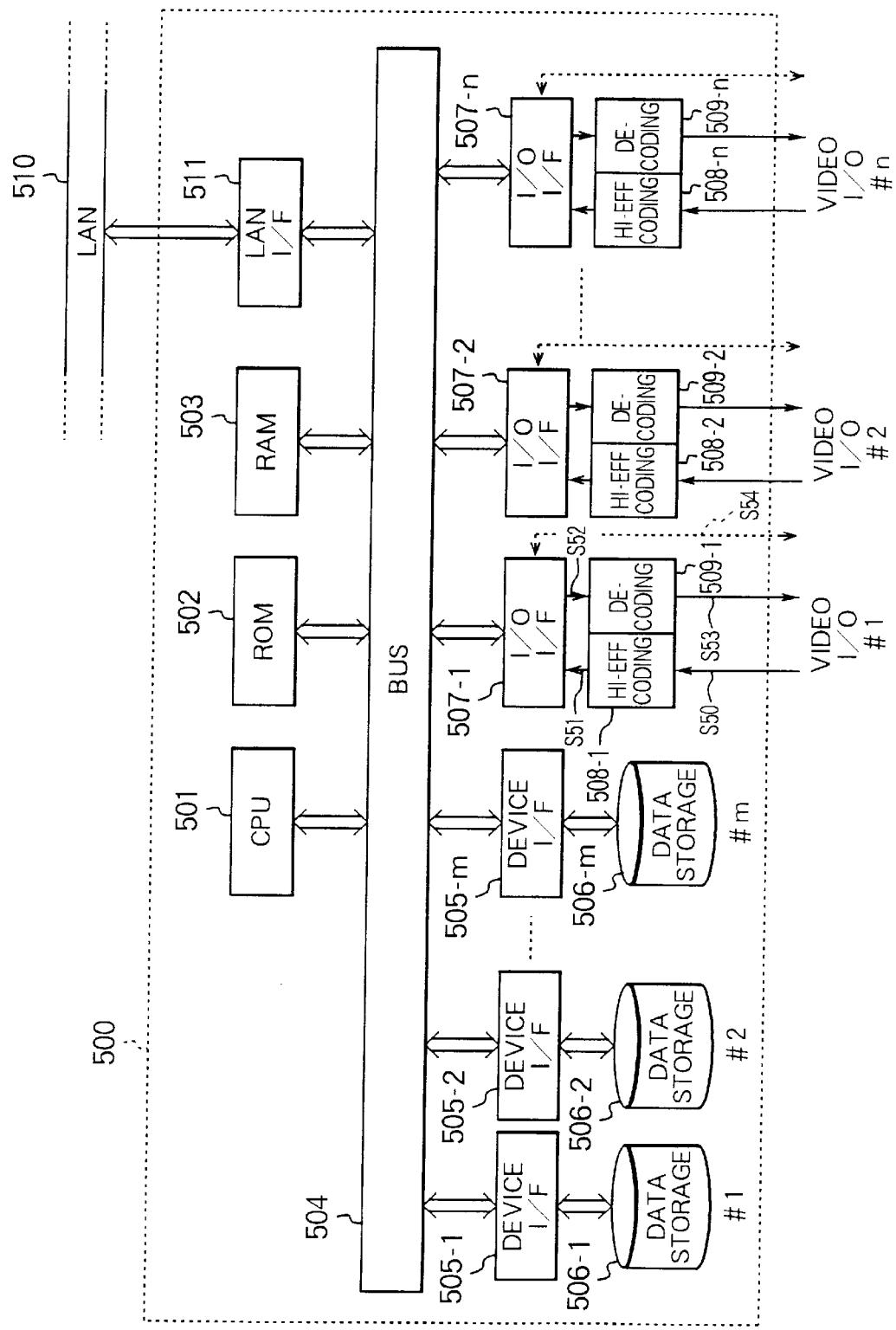
FIG. 1 is a block diagram of an example of the configuration of a video signal server system based on a concept similar to a server system used in a computing system.

FIG. 1 is a view of an example of the configuration of a server system for a video signal by a concept similar to the server system used in a computing system.

As shown in FIG. 1, the server system 500 is basically comprised of basic computer components such as a CPU 501, ROM 502, and RAM 503, a high speed bus 504, data storage apparatuses 506-1 to 506-m connected through device interfaces 505-1 to 505-m, video signal high-efficient encoding apparatuses 508-1 to 508-n connected through input/output interfaces 507-1 to 507-n, and video signal decoding apparatuses 509-1 to 509-n corresponding to the same.

When the host application system is realized on a separate computer, a LAN interface 511 is provided for connecting a LAN 510 and system 500.

In the system 500, when recording a video signal, the input video signal S50 is encoded at a high-efficiency in the video signal high-efficiency encoding apparatus 508 and becomes the high-efficient encoded video data S51 which is transferred through the input/output interface 507 to the high speed bus 504. The high-efficient encoded video data transferred on the bus 504 is temporarily stored in the RAM 503 for ordinary data flow control etc., then is once again transferred to the bus 504 and is sent through the device interface 505 for recording in the data storage apparatus 506.

On the other hand, when reproducing a video signal, the high-efficient encoded video data which had been stored in the data storage apparatus 506 is reproduced through the device interface 505, then is transferred to the high speed bus 504. The high-efficient encoded video data transferred to the bus 504, in the same way as at the time of recording, is temporarily stored in the RAM 503, then is transferred to the bus 504 and is sent through the input/output interface 507 to become the input data S52 of the video signal decoding apparatus 509. The video signal decoding apparatus 509 decodes the video signal S53 from the input data S52 and outputs it from the system 500.

In the above recording and reproducing operations, the input/output interfaces 507-1 to 507-n, bus 504, and device interfaces 505-1 to 505-m all operate under the control of a CPU 501 which receives instructions from the application system through the LAN 510, LAN interface 511, bus 504, and RAM 503.

Note that when the operating instructions are supplied from the input/output side of the video signal rather than the application system, the control line S54 connected to the input/output interface 507 shown by the broken line in FIG. 1 is necessary. In this case, the instructions supplied from the control line S54 are transmitted to the CPU 501 through the input/output interface 507, bus 504, and RAM 503 and are reflected in the control by the CPU 501.

The above is not necessarily suitable for realization of a server system assuming recording and reproduction of a high quality video signal handled in a broadcasting station of the configuration explained above for the following reasons.

A first point posing a hurdle in handling a video signal of a high quality of a level usable in a broadcasting station is the restriction on the system size and its expandability caused by the insufficient data transfer capability of the buses.

The speed of the data obtained by digitization of a current television video signal is at least 100 Megabits/second. Even the speed of video signal high-efficient encoded data obtained by high-efficient encoding of this, assuming deterioration caused by the editing, would be about 30 Megabits/second, that is, 4 Megabytes/second, as described for example in CCIR Recommendation 733.

Therefore, for example, if desiring to realize a system enabling eight editors to make joint use of original video data and enabling so-called "AB roll" editing where two sets of data are accessed simultaneously, then, considering also the interposition of the RAM 503, there would be a total of 48 series of video signal high-efficient encoded data on the bus 504 at the same time, that is, 3 (for reproducing two sets of data simultaneously and recording one edited video)×2 (travel to and from the RAM)×8 (number of editors). Accordingly, the bus would have to have an effective transfer speed of 192 Megabytes/second just for the video signal high-efficient encoded data.

Further, there is the restriction inherent to a server system for a video signal for a broadcasting station that the transfer of data to the input/output interface must be instantaneous. The processing capability of the CPU controlling the bus and RAM therefore also becomes a problem.

In addition, the physical transfer speed of a bus in a general high performance computer is about 100 Megabytes. Even a system of a size enabling at most eight editors to make joint use of original video data would not necessarily be easy to realize technically speaking. Further, even if realized, it would be necessary to construct special hardware, which would not be rational cost-wise.

A second point posing a hurdle in realization of a system usable in a broadcasting station is the synchronization dependency of the system to external synchronization.

Normally, in a system in a broadcasting station, a video signal is transmitted and sent out in strict synchronization with the reference synchronization signal for the video signal, so to facilitate connection with existing apparatuses, it is necessary that the video signal of the server system be input and output in synchronization with the reference synchronization signal. It is not necessarily easy to realize this by a system configured about a computer which basically operates asynchronously.

That is, in a configuration which transfers and switches data using an asynchronous bus and RAM, the video data which is inherently to be input and output in synchronization with the reference synchronization signal inevitably passes through an asynchronous system in that system and therefore synchronization/asynchronization conversion becomes necessary. This invites an increase in the size and cost of the equipment.

A third point posing a hurdle in realizing a system usable in a broadcasting station is the hurdle in operation caused by the system delays created during the processing for the transfer and switching of data using the asynchronous bus and RAM and the processing for synchronization/asynchronization conversion.

System delays become problems not only in the sense of the absolute amount of the delay in the editing work etc., but also as to if the amount of delay should be fixed or not in system automation designed based on time lines. Regarding the absolute amount of the delay, in the configuration of FIG. 1, for example, during reproduction, it is necessary to control the amount of flow of data using a memory at three locations, that is, the device interfaces 505-1 to 505-n, the RAM 503, and the input/output interfaces 507-1 to 507-n, so it is basically difficult to achieve the response performance demanded in editing work. Further, regarding fixing the amount of the delay, since the basic parts of the system operate asynchronously, this is not easy to guarantee.

A fourth point posing a hurdle in realizing a system usable in a broadcasting station is that when high speed transfer of data is required between data storage means so as to deal with possible breakdowns of data storage means, a sufficient speed of transfer cannot be secured due to the problem of bus capacity mentioned above.

Further, in the configuration of FIG. 1, data is transferred between data storages of different server systems through the LAN 510, but existing LANs have for example insert transfer capacities of 10 Megabits/second or so and therefore require a long time for transfer, so are not suited to practical use.

A fifth point posing a hurdle in realizing a system usable in a broadcasting station is that when the data is recorded and reproduced in and from the server system under the control of for example an external control apparatus, the above-mentioned problems of synchronization and delay occur.

When realizing such a system, it is necessary to connect a special control line S54 as shown by the broken line of FIG. 1 for example to the input/output interfaces 507-1 to 507-n, but in this case the control instructions are sent through the bus 504 to the CPU 501 and then through the bus 504 to the device interfaces 505-1 to 505-m and the input/output interfaces 507-1 to 507-n, so delay ends up being caused in the transmission of the instructions themselves.

Further, even if delay-free control were possible, practical operation could not be achieved unless solving the problem of the system delays in the data.

A sixth point posing a hurdle in realizing a system usable in a broadcasting station is that in a server system configured about a direct extension of the computer technology of the prior art, the data is transferred and switched using a bus and RAM, so the above-mentioned problems in bus capacity etc. make the transfer and switching of deterioration-free baseband-frequency digital video signals difficult and force high-efficient encoding of all video signals.

High-efficient encoding is a superior technique when it comes to the effective utilization of hardware resources, but there is original video data for which application of high-efficient encoding will cause problems in the quality of the video signal. While rare, it is possible that the quality of the video signal will become a level not acceptable to the broadcasting system.

Figure 2:
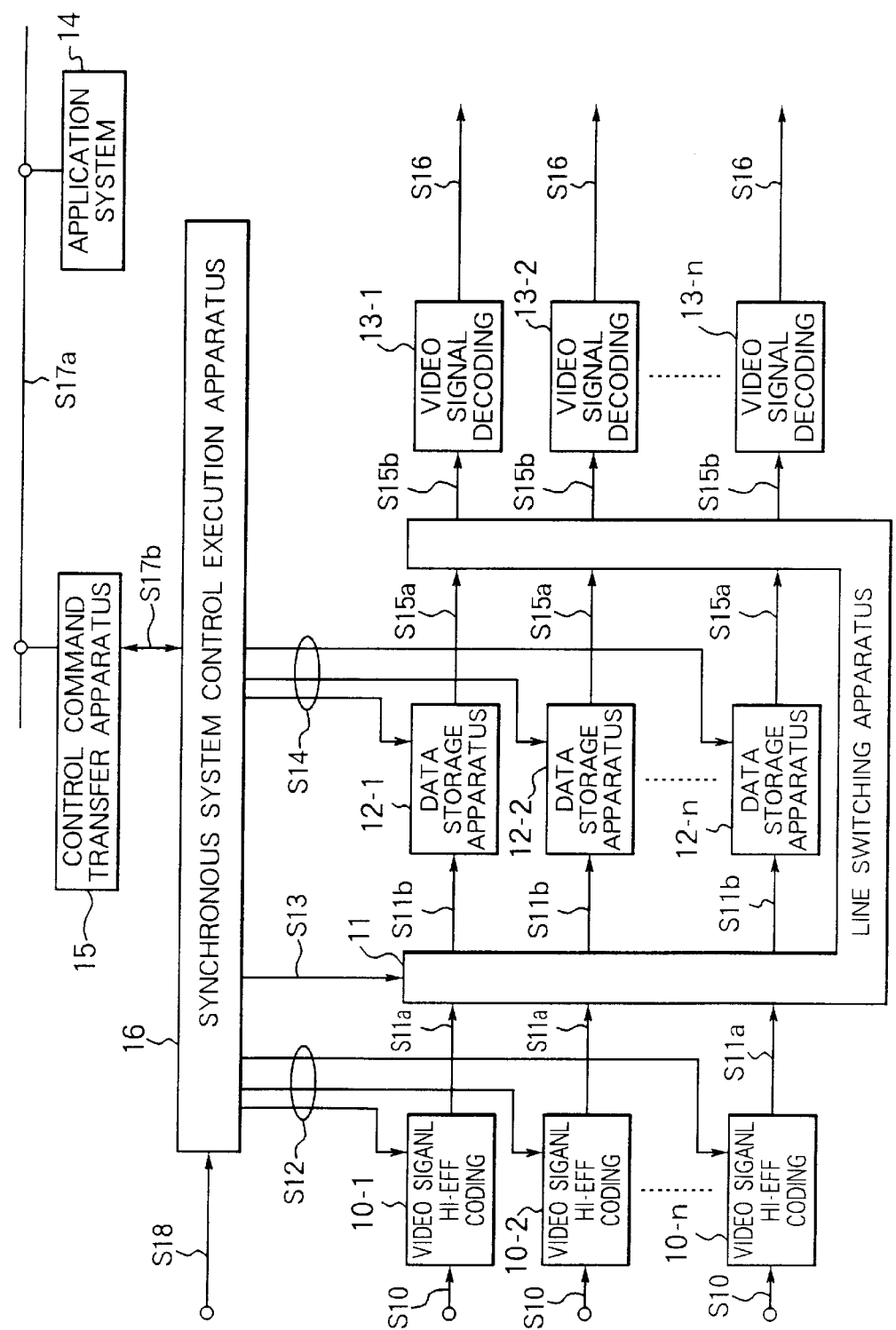
FIG. 2 is a block diagram of a video signal recording and reproduction apparatus according to a first embodiment of the present invention.

FIG. 2 is a block diagram of a video signal recording and reproduction apparatus according to a first embodiment of the present invention.

In FIG. 2, digitalized input video signals S10 are input to the variable encoding efficiency video signal high-efficient encoding apparatuses 10-1 to 10-n where they are encoded at a high efficiency and become the high-efficient encoded video data S11a.

The encoding efficiencies of the video signal high-efficient encoding apparatuses 10-1 to 10-n are set in advance by the control signals S12 supplied from the synchronous system control execution apparatus 16.

If the high-efficient encoding apparatuses 10-1 to 10-n extract the clocks and frame timing from the input video signals S10 and use them internally, then it would become possible to input the video signals in synchronization with the video signal synchronization signal.

The high-efficient encoded video data S11a are input to a line switching apparatus 11 such as a routing switcher for a broadcasting station. In the line switching apparatus 11, the destination of the line switching operation is set by a control signal S13 supplied from the synchronous system control execution apparatus 16. Accordingly, the high-efficient encoded video data S11a input to the line switching apparatus 11 are transmitted to the predetermined data storage apparatus 12 connected by the set route as input high-efficient encoded video data S11b.

The high-efficient encoded video data S11b are recorded in the independently controlled data storage apparatuses 12-1 to 12-n by a control signal S14 supplied from the synchronous system control execution apparatus 16.

Figure 3:
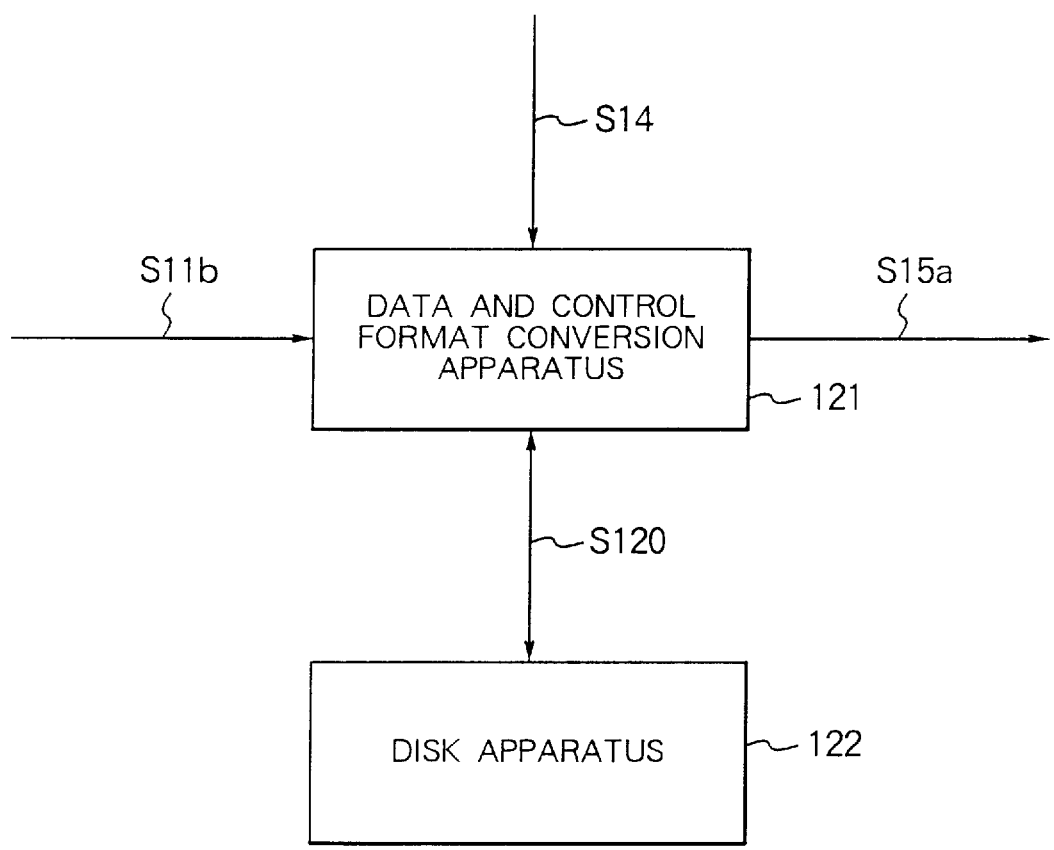
FIG. 3 is a block diagram of an example of a data storage apparatus in a video signal recording and reproduction apparatus shown in FIG. 2.

The data storage apparatuses 12-1 to 12-n are each comprised, as shown for example in FIG. 3, by a data and control format conversion apparatus 121 and a general use disk apparatus 122.

In FIG. 3, the high-efficient encoded video data S11b transferred by a data transmission medium able to transfer a baseband-frequency digital video signal is input to the data and control format conversion apparatus 121 where it is converted to a format able to be input to the disk apparatus 122, for example, a format according to the SCSI format.

On the other hand, the data reproduced from the disk apparatus 122 is input to the data and control format conversion apparatus 121 where it is converted to the same data format as at the time of recording and becomes the reproduced high-efficient encoded video data S15a which is transmitted by a data transmission medium able to transmit a baseband-frequency digital video signal.

The data and control format conversion apparatus 121 converts the control format to a format able to control the disk apparatus 122 in accordance with a control signal S14 supplied from the synchronous system control execution apparatus 16.

By configuring the system in this way, the data and control format conversion apparatus 121 and the general use disk apparatus 122 can be connected through a general use connection line S120 carrying a mixture of data and control signals and recording and reproduction of encoded video data becomes possible using a general use disk apparatus.

Further, by configuring the system in this way, the data storage apparatus 12 can be changed in the speed of recording and reproduction up to the extent of the maximum data transfer speed of the disk apparatus 122.

Note that as the disk apparatus 122, use may be made of a magnetooptic (MO) disk apparatus, hard disc apparatus, etc.

The reproduced high-efficient encoded video data S15a is input to the line switching apparatus 11 in the same way as at the time of recording. In the line switching apparatus 11, the destination of the line switching operation is set by a control signal S13 supplied from the synchronous system control execution apparatus 16. Accordingly, the high-efficient encoded video data S11a input to the line switching apparatus 11 are conveyed to the predetermined video signal decoding apparatuses 13-1 to 13-n connected by the set route as the high-efficient encoded video data S15b.

The high-efficient encoded video data S15b are decoded in the video signal decoding apparatuses 13-1 to 13-n into the decoded video signals S16 which are then for example output to an editing apparatus.

In the example of FIG. 2, no control signal was input to the video signal decoding apparatuses 13, but this was because this type of decoding apparatus is configured to automatically be slaved to changes in the encoding efficiency.

Further, in the control system of this system, first, a plurality of independent control instructions S17a issued from a host application system 14 comprised of one or more computers are successively transferred through a LAN to a control instruction transfer apparatus 15 usually comprised of a single computer in the form based on the general purpose protocol.

The control instruction transfer apparatus 15 transfers to the synchronous system control execution apparatus 16 the control instructions S17b obtained by protocol conversion for enabling communication with the synchronous system control execution apparatus 16.

Figure 4:
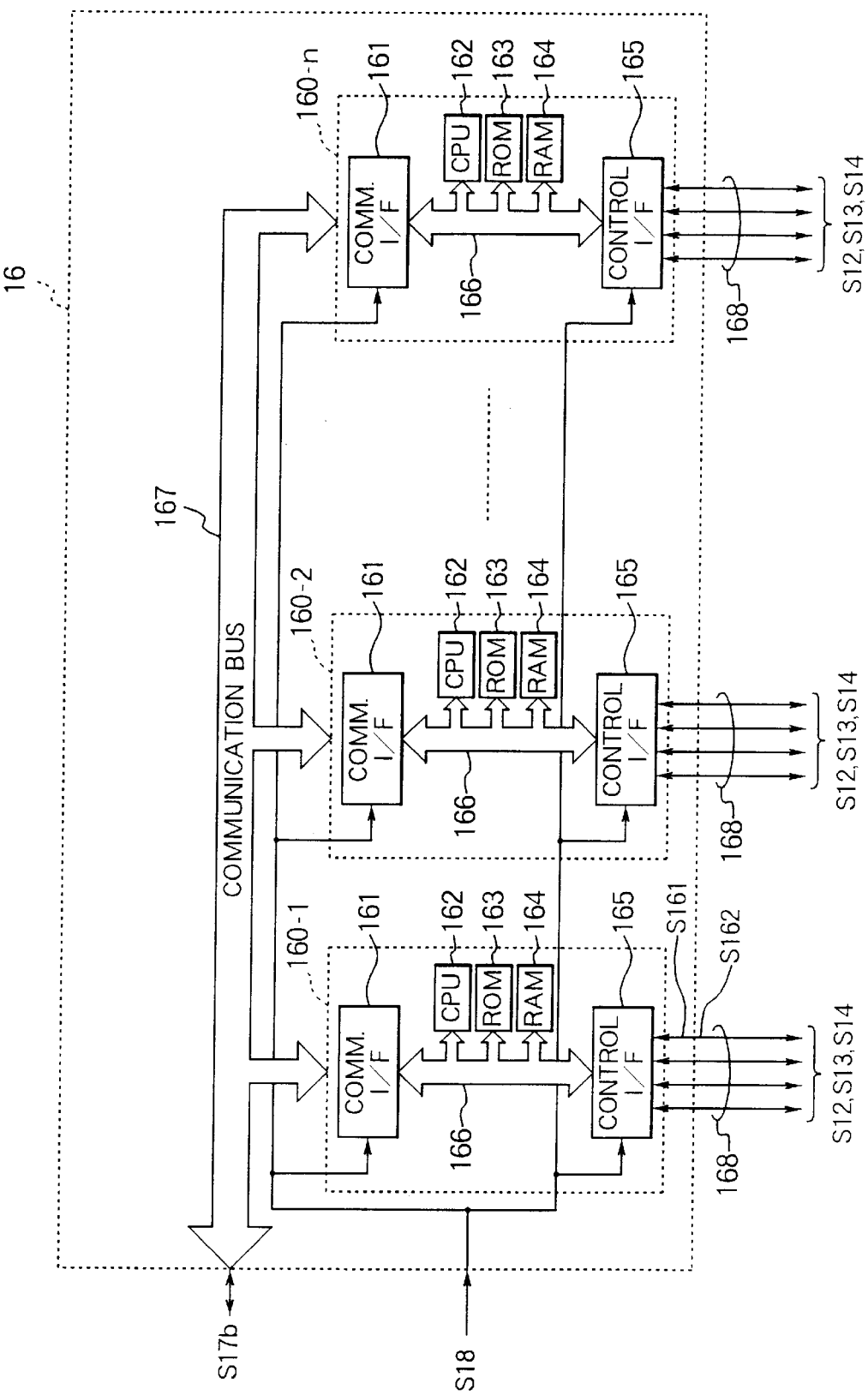
FIG. 4 is a block diagram of an example of a synchronous system control execution apparatus in a video signal recording and reproduction apparatus shown in FIG. 2.

The synchronous system control execution apparatus 16 is comprised, for example as shown in FIG. 4, of a plurality of computers (hereinafter referred to as "CPU units") 160-1 to 160-n.

The CPU units 160-1 to 160-n are each basically comprised of a communication interface 161, the basic computer components of a CPU 162, ROM 163, and RAM 164, and a control interface 165 connected to a bus 166 operating under the control of the CPU 162.

The plurality of CPU units 160-1 to 160-n are joined by connecting the communication bus 167 and communication interface 161. The communication bus 167 is connected to a control instruction transfer apparatus 15 for transfer of control instructions S17b.

In the CPU units 160-1 to 160-n, a video signal reference synchronization signal S18 is supplied to the control interface 165.

The control interface 165 is configured so as to handle the control for a number of controlled apparatuses. For example, it is configured to have control lines 168 enabling input and output of a plurality of control signals such as the control signals S12, S13, and S14 shown in FIG. 2.

The video signal reference synchronization signal S18, as shown in FIG. 4, may be supplied to the communication interface 161 as well and be put to use for achieving high speed communication or fixing the delay time caused due to the communication.

Further, it is also possible to supply some sort of time information such as a station time code in addition to the video signal reference synchronization signal S18 so as to enable control based on a time line.

In the configuration of FIG. 4, first a control instruction S17b is supplied from the control instruction transfer apparatus 15 to the communication bus 167.

The communication interface 161 of each of the CPU units 160-1 to 160-n fetches the control instructions which the unit is to process from the communication bus 167 and transfers them to the internal bus 166. The control instructions fetched to the internal bus 166 are converted to instructions for real time control for actually controlling the devices and are transferred to the control interface 165.

At the control interface 165, the video signal reference synchronization signal S18 is referred to and the devices are communicated with by, for example, an accurate timing within a frame period so as to realize control by for example the control signals S12, S13, and S14 such as shown in FIG. 2. By this, the encoding efficiencies of the video signal high-efficient encoding apparatuses 10-1 to 10-n are set, the lines connecting the video signal high-efficient encoding apparatuses 10-1 to 10-n or the video signal decoding apparatuses 13-1 to 13-n and the data storage apparatuses 12-1 to 12-n are set or switched under the control of the line switching apparatus 11, and the operation of the data storage apparatuses 12 at the time of recording and reproduction is controlled.

Figure 5:
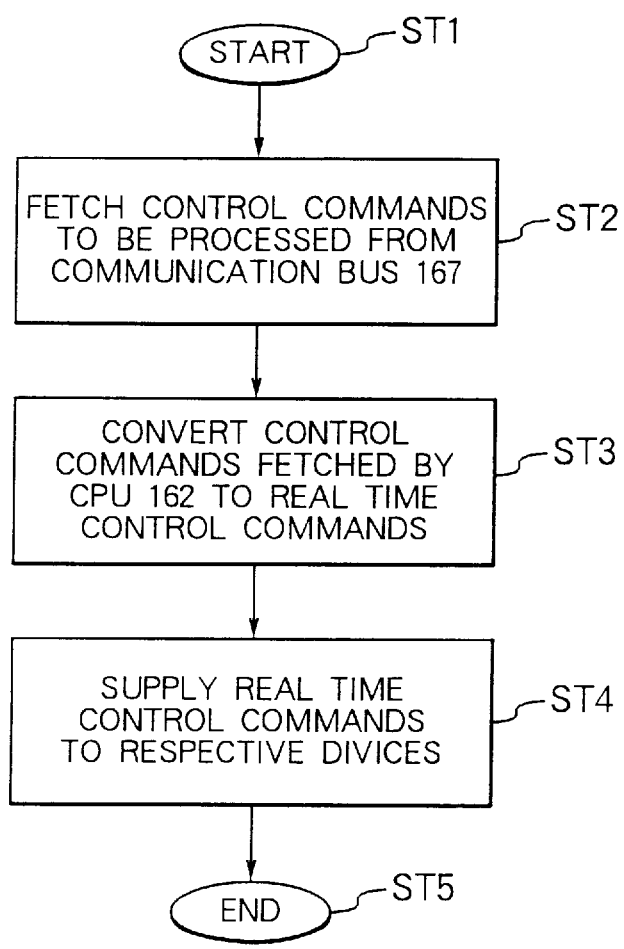
FIG. 5 is a flow chart of an example of the operation of the CPU 2 in the synchronous system control execution apparatus shown in FIG. 4.

Further, the CPU units 160-1 to 160-n supply the devices with real time control commands based on the flow chart shown in FIG. 5.

At step ST1, the operation is started.

At step ST2, the communication interface 161 fetches the control commands to be processed from the communication bus 167 and transmits them to the internal bus 166.

At step ST3, the CPU 162 converts the control commands fetched into the internal bus 166 into real time control commands for controlling the devices.

At step ST4, the real time control commands are supplied to the devices through the control interface and at step ST5, the operation is ended.

In such a configuration, by making the communication bus 167 and communication interface 161 and the control interface 165 operate in synchronization with the video signal reference synchronization signal S18 and, further, limiting the processing in the CPU 162, ROM 163, and RAM 164, fixing the amount of system delay relating to the control inside the synchronous system control execution apparatus 16 to units of frame periods becomes easy.

Further, the control interface 165 gives priority to issuing control signals at accurate timings in synchronization with the video signal reference synchronization signal S18, so it becomes possible to easily satisfy the conditions relating to the timing of control signals, which differ depending the devices and require accuracy.

Further, by giving an extra leeway to just the communication capacity of the communication bus 167, it becomes possible to easily expand the synchronous system control execution apparatus 16 by increasing the number of the CPU units 160, so the flexibility of the number of the devices and apparatuses under the control of the synchronous system control execution apparatus 16 is maintained and as a result the expandability of the scale of the system is maintained.

Further, the following operation is performed when the data transfer instructions are issued from a host application system 14.

That is, the data transfer control instructions S17a issued from the host application system 14 are transferred to the control instruction transfer apparatus 15 where they are converted in protocol to enable communication with the synchronous system control execution apparatus 16.

The synchronous system control execution apparatus 16 follows the control instructions S17b obtained by protocol conversion, refers to the video signal reference synchronization signal, controls the reproduction side data storage apparatus 12(a), line switching apparatus 11, and recording side data storage apparatus 12(b) at a suitable timing, and executes the transfer of data between the data storage apparatuses 12.

Here, a data storage apparatus on the reproduction side among the plurality of data storage apparatuses 12-1 to 12-n is designated as 12(a) and a data storage apparatus on the recording side is designated as 12(b).

When transferring data between data storage apparatuses 12, the reproduction side data storage apparatus 12(a) is controlled by the control signal S14 to reproduce the stored data and output the reproduced data train S15a. The reproduced data train S15a is input to the line switching apparatus 11, such as a broadcasting station use routing switcher, where it is switched as set in advance by the control signal S13, is connected to the recording side data storage apparatus 12(b), and becomes the input data S11b. The input data S11b is recorded in the data storage apparatus 12(b) by the control signal S14.

Further, by performing the logical switching of control signals using a function of setting a control signal line connecting any devices of the synchronous system control execution apparatus 16 shown in FIG. 4, it becomes possible to realize the transfer of control instructions between any devices included in a lower system and high speed transfer of control instructions from outside the lower system through the control signal line without having to go through the host application system 14.

In this case, the following operation is performed.

For example, by having the logical circuit setting instructions S17a for transfer of control instructions, issued from the host application system 14, be transferred to the control instruction transfer apparatus 15 and having the synchronous system control execution apparatus 16 receiving the same allocate time slots of the communication bus 167 which the communication interface 161 of the CPU unit 160-1 and the communication interface 161 of the CPU unit 160-2 can make exclusive use of, it is possible to set a logical circuit for transfer of control instructions.

When transferring control instructions between the CPU unit 160-1 and the CPU unit 160-2, first, the control signal input from an apparatus connected to the control interface 165 of the CPU unit 161-1 is supplied to the internal bus 166 and then is immediately transferred to the communication interface 161 under the control of the CPU 162. The communication interface 161 sends the transferred control instructions to the communication bus 167. The control instructions sent to the communication bus 167 are transferred by the communication interface 161 of the CPU unit 160-2 to the internal bus 166 of the CPU unit 160-2, are immediately transferred to the communication interface 161 under the control of the CPU 162, and from there are supplied to the apparatus connected to the control interface 165 of the CPU unit 160-2.

By using the above system, it becomes easy to fix the amount of system delay relating to the control in the synchronous system control execution apparatus 16 to units of frame periods.

Further, the control interface 165 gives priority to issuing control signals at accurate timings in synchronization with the video signal reference synchronization signal S18 and therefore the conditions relating to the timing of control signals, which differ depending the devices and require accuracy, are easily satisfied. The controlled devices thereby operate smoothly even though there are system delays of units of frame periods.

In addition to the above mentioned system, it is possible to realize the transfer of control instructions between devices connected to the same control interface 165 by the configuration of FIG. 4.

In this case, for example, control instructions S161 from a control side (master) device are input to the control interface 165 and are returned once again to the control interface 165 through the bus 166 and RAM 164. The control interface 165 refers to the video signal reference synchronization signal S18 and issues control instructions S162 at an accurate timing in the same way as explained above.

Figure 6:
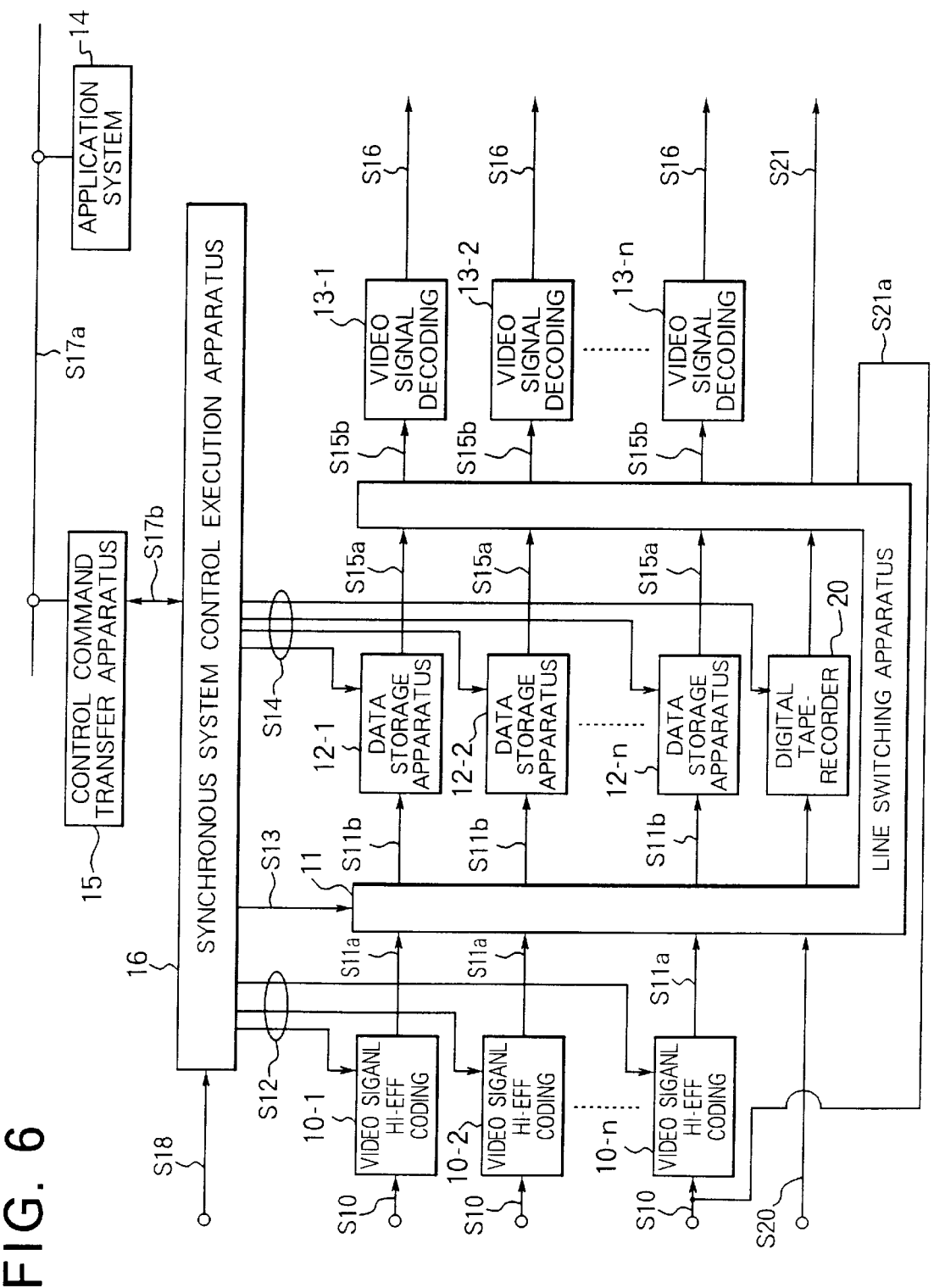
FIG. 6 is a block diagram of a video signal recording and reproduction apparatus according to a second embodiment of the present invention.

FIG. 6 is a block diagram of a video signal server system according to a second embodiment of a video signal recording and reproduction apparatus of the present invention.

In the second embodiment, in addition to the configuration of the first embodiment shown in FIG. 2, a digital baseband-frequency video signal input S20 and digital baseband-frequency video signal output S21 are added to the line switching apparatus 11 of the system, an ordinary digital video tape recorder 20 for example is disposed in line with the data storage apparatuses 12, and therefore both digital baseband-frequency video signals and high-efficient encoded video data are recorded and reproduced in the same system.

Further, it is possible to once record a digital baseband-frequency video signal as it is at the digital video tape recorder 20 and, when needed, reproduce it and perform high-efficient encoding using the video signal high-efficient encoding apparatus 10, and record the result in the data storage apparatuses 12 for use. At this time, a digital baseband-frequency video signal output from the line switching apparatus 11 is supplied through the transmission line S21a to the input terminal of the video signal high-efficient encoding apparatus 10-n.

Further, for control, the data storage apparatus 12 and the digital video tape recorder 20 are switched. The control may be performed in the same way as with the case of the first embodiment explained above except for the control for the video signal high-efficient encoding apparatuses 10-1 to 10-n and the video signal decoding apparatuses 13-1 to 13-n.

As explained above, according to the video signal recording and reproduction apparatus of the present invention, by giving flexibility to the size of the control system, it becomes possible to easily and inexpensively configure a system with far fewer restrictions as to the system size and expandability than in the past.

As a result, for example, in the system of a broadcasting station, it becomes possible to construct a server system of the optimal size for the scale of the work in the broadcasting station or the type of the work using the system in the same station and, further, it becomes possible to easily change the size and functions of the system.

Further, according to the present invention, since the video signal is input and output in strict synchronization with the video signal reference synchronization signal and the data is transferred and exchanged inside the system, it becomes possible to more easily construct a system with a high compatibility with existing apparatuses and systems in a system in a broadcasting station than in the past.

Further, according to the present invention, since the locations where delay is caused in the system can be drastically cut and a system configuration can be obtained enabling the delay to be quantized to a fixed amount, it becomes possible to more easily configure a system for a broadcasting station requiring a high control response capability than in the past.

Further, according to the present invention, since it is easy to transfer and switch data at a high speed and independently so that the data is transferred between data storage apparatuses in a manner not detectable by the system user, it becomes possible to more efficiently copy a video signal in a system in a broadcasting station than in the past.

Further, according to the present invention, since provision is made of a function by which the external control instructions themselves are directly switched and high speed transfer of the control instructions becomes possible, it becomes possible to more easily configure a system where high speed response is required, such as due to editing in a broadcasting station, than in the past.

Further, according to the present invention, since it is possible to configure the system so as to enable free transfer and switching of data even in the state of a deterioration-free baseband-frequency digital video signal, it becomes easy to rationally operate the system in a manner never before seen, where for example recording is performed in a digital video tape recorder once in the state of the digital baseband-frequency video signal as it is and then, when necessary, this is reproduced and used subjected to high-efficient encoding at an encoding efficiency giving the picture quality commensurate with the application.

Next, an explanation will be made of a third embodiment of the present invention using a plurality of editing apparatuses as the application system 14 shown in FIG. 2 and FIG. 6.

Figure 7:
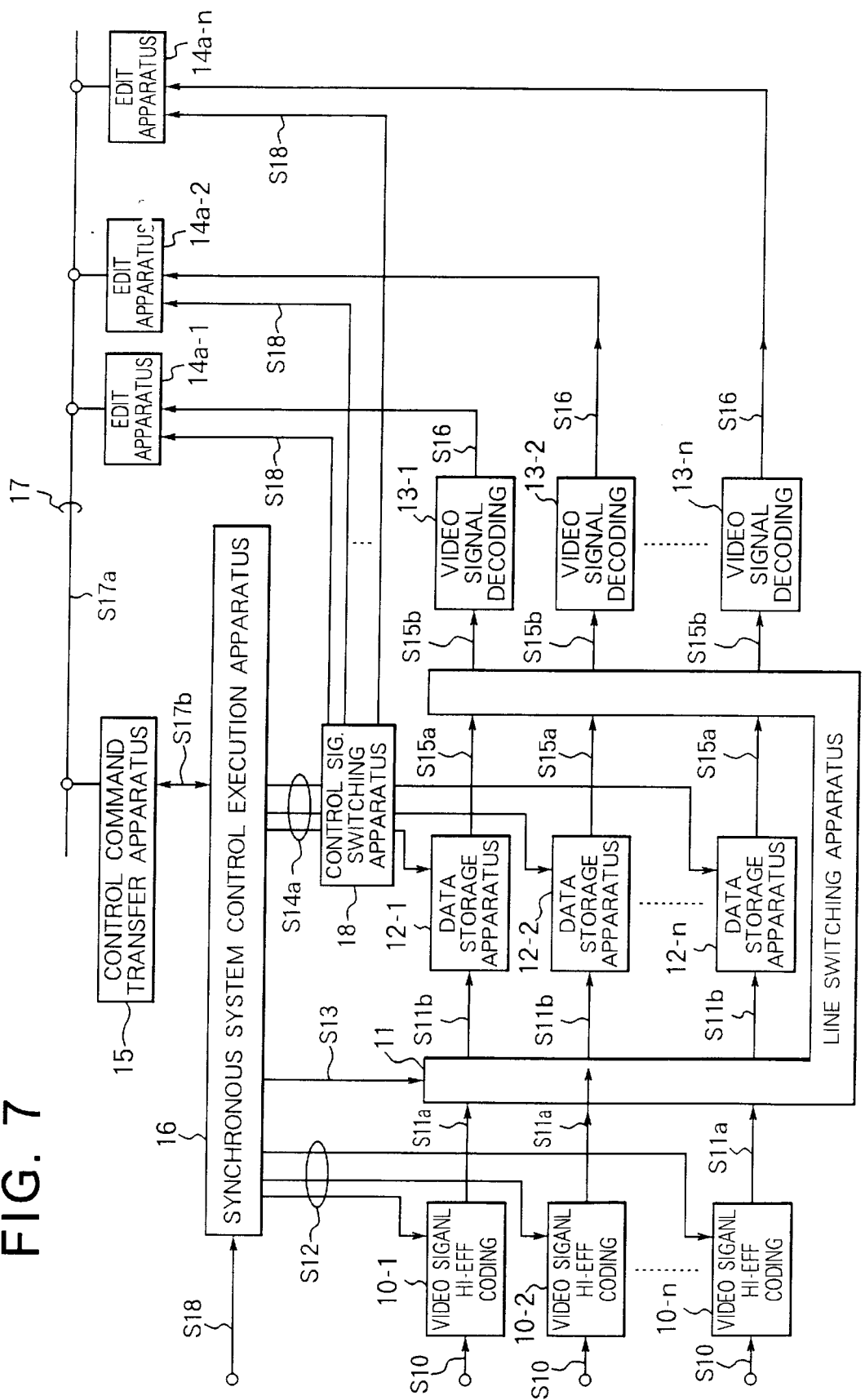
FIG. 7 is a block diagram of a video signal recording and reproduction apparatus according to a third embodiment of the present invention.

FIG. 7 is a block diagram of an embodiment of a video editing system according to the present invention. Constituent portions the same as in FIG. 2 are shown by the same reference.

That is, this video editing system is comprised of the video signal high-efficient encoding apparatuses 10-1 to 10-n, line switching apparatus 11, data storage apparatuses 12-1 to 12-n, video signal decoding apparatuses 13-1 to 13-n, editing apparatuses 14a-1 to 14a-n, control instruction transfer apparatus 15, synchronous signal control execution apparatus 16, computer network 17, and control signal switching apparatus 18.

The editing apparatuses 14a-1 to 14a-n are each configured by one or more computers. When reproducing material etc., they designate the addresses of the video data required at the computer network 17 and output requests for operation, such as reproduction or stopping, that is, the AV equipment control signals S18, to the control signal switching apparatus 18 by a route different from the computer network 17.

The AV equipment control signals S18 are based on a so-called "9 protocol". Control signals are sent and signals responding to the same are received in one frame.

The control signal switching apparatus 18 receives the control signals S18 output from the synchronous signal control execution apparatus 16 based on the address designation of the editing apparatuses 14a-1 to 14a-n, switches the destination of the output of the AV equipment control signals S18 output from the editing apparatuses 14a-1 to 14a-n, and cause the signals to be input to the desired one of the data storage apparatuses 12-1 to 12-n.

Note that the data storage apparatuses 12-1 to 12-n, for example, as shown in FIG. 3, are each configured of a data and control format conversion apparatus 121 and general use disk apparatus 122.

In FIG. 3, the high-efficient encoded video data S11b transmitted by a data transmission medium able to transmit a baseband-frequency digital video signal is input to the data and control format conversion apparatus 121 where it is converted to a format enabling input to a disk apparatus 122.

On the other hand, the data reproduced from the disk apparatus 12 is input to the data and control format conversion apparatus 121 where it is converted to the same data format as at the time of recording and becomes the reproduced high-efficient encoded video data S15a transmitted by a data transmission medium able to transmit a baseband-frequency digital video signal.

The data and control format conversion apparatus 121 is changed in control format to a format enabling control of the disk apparatus 122 in accordance with control signals S14 from the synchronous signal control execution apparatus 16.

By adopting this configuration, the data and control format conversion apparatus 121 and the general use disk apparatus 122 can be connected through a general use connection line S120 carrying a mixture of ordinary data and control signals and recording and reproduction of encoded video data becomes possible using a general use disk apparatus 122.

Further, by adopting this configuration, the data storage apparatus 12 can be changed in the speed of recording and reproduction to the extent of the maximum data transfer speed of the disk apparatus 122.

Note that as the disk apparatus 122, use may be made for example of a magnetooptic (MO) disk apparatus.

Further, it is possible to configure a system having an SCSI or other general use interface and including a disk changer. In this case, the disk charger is controlled by control signals S14a from the synchronous signal control execution apparatus 16.

Next, an explanation will be made of the operation by the above configuration.

First, the digitalized input video signals S10 are input to the variable encoding efficiency video signal high-efficient encoding apparatuses 10-1 to 10-n where they are encoded at a high efficiency and become the high-efficient encoded video data S11a.

The encoding efficiencies in the video signal high-efficient encoding apparatuses 10-1 to 10-n are set in advance by the control signals S12 from the synchronous signal control execution apparatus 16.

Further, if the high-efficient encoding apparatuses 10-1 to 10-n extract the clocks and frame timing from the input video signals S10 and use them internally, then it would become possible to input the video signals in synchronization with the video signal synchronization signal.

The high-efficient encoded video data S11a is input to a line switching apparatus 11 such as a routing switcher of a broadcasting station. In the line switching apparatus 11, the destination of the line switching operation is set by the control signals S13 from the synchronous signal control execution apparatus 16. Accordingly, the high-efficient encoded video data S11a input to the line switching apparatus 11 is conveyed as the input high-efficient encoded video data S11b to the predetermined data storage apparatus 12 connected by the set route.

The high-efficient encoded video data S11b is recorded in the data storage apparatuses 12-1 to 12-n, which are separately controlled by the control signals S14 from the synchronous signal control execution apparatus 16.

In this way, when decoding a video signal recorded in the data storage apparatuses 12-1 to 12-n and editing by any of the editing apparatuses 14a-1 to 14a-n, the address of the material, that is, the video data, which is required by the editing apparatus 14a-1 for example, configured by one or more computers, is sent as the control signal S17a through the computer network 17 to the control instruction transfer apparatus 15. The requests for operation such as reproduction or stopping, that is, the AV equipment control signals S18, are output to the control signal switching apparatus 18 by a different route from the computer network 17.

The control signals S17a are successively transferred through a LAN to the control instruction transfer apparatus 15, usually configured of a single computer, in a form based on the general use protocol.

The control instruction transfer apparatus 15 transfers to the synchronous signal control execution apparatus 16 the control instructions S17b obtained by protocol conversion for enabling communication with the synchronous signal control execution apparatus 16.

In the synchronous signal control execution apparatus 16, control signals S13 are output to the line switching apparatus 11 in accordance with the content of the control instructions S17b and the destination of the line switching operation is set. Control signals S14a setting the route of the control signals to the data storage apparatus 12-2 in which the data whose address is designated is recorded are output to the control signal switching apparatus 18 from the synchronous system control execution apparatus.

In the control signal switching apparatus 18, the control signals S14a output from the synchronous signal control execution apparatus 16 are received and the destination of the output of the AV equipment control signals S18 output from the editing apparatus 14a-1 is switched. Due to this, the operation requests to the desired data storage apparatus 12-1, such as for reproduction or stopping, that is, the AV equipment control signals S18, are sent to the data storage apparatus 12-2 in which the video data to be reproduced is recorded.

As a result, high-efficient encoded video data S15a is reproduced from the data storage apparatus 12-2 receiving the control signals S18.

The reproduced high-efficient encoded video data S15a is input to the line switching apparatus 11 in the same way as at the time of recording. In the line switching apparatus 11, since the destination of the line switching operation is set by the control signals S13 from the synchronous signal control execution apparatus 16, the reproduced high-efficient encoded video data S15a input to the line switching apparatus 11 is conveyed as the high-efficient encoded video data S15b to the predetermined video signal decoding apparatus 13-1 connected through the set route.

The high-efficient encoded video data S15b is decoded in the video signal decoding apparatus 13-1 to the restored video signal S16 which is then output to the editing apparatus 14a-1. Due to this, the predetermined editing may be performed in the editing apparatus 14a-1.

As explained above, according to the present embodiment, data is designated from the editing apparatuses 14a-1 to 14-a-n at the server control system, that is, the control instruction transfer apparatus 15, through the computer network 17, and control signals S18 showing operation requests, such as for reproduction or stopping, are output to the control signal switching apparatus 18 by a route different from the computer network 17. In the control signal switching apparatus 18, the route of transmission of the control signals S18 is switched based on control signals S14a from the synchronous signal control execution apparatus 16 to transfer the operation requests, that is, control signals S18, to the desired data storage apparatus 12-1 to 12-n. Therefore, it is possible to realize a video editing system which can immediately respond to requests from a plurality of editing apparatuses, not just a single editing apparatus, without being affected by the transfer capability of the computer network.

As explained above, according to the video editing system of the present invention, it is possible to immediately respond even to requests from a plurality of editing apparatuses, not just a single editing apparatus, without being affected by the transfer capability of the computer network.

What is claimed is:

1. A video signal recording and reproduction apparatus, comprising:

a plurality of encoding means, each said encoding means being operable to perform compression encoding on one or more input video signals;

at least one data storage means for recording and reproducing one or more encoded video signals generated by said encoding means;

a line switching means for selectively connecting said encoding means and said data storage means, and/or for selectively connecting said data storage means and one or more output lines; and a control means for controlling said plurality of encoding means, said line switching means and said data storage means in response to one or more instructions;

wherein each of said encoding means is independently controllable by said control means, and each of said data storage means is independently controllable by said control means.

2. A video signal recording and reproduction apparatus as set forth in claim 1, wherein said control means sets an encoding efficiency of said encoding means in accordance with a content of said one or more instructions.

3. A video signal recording and reproduction apparatus as set forth in claim 1, wherein said data storage means records and reproduces the data output from said encoding means in synchronization with a standard synchronization signal.

4. A video signal recording and reproduction apparatus as set forth in claim 3, wherein said data storage means is variable in recording and reproduction speed.

5. A video signal recording and reproduction apparatus as set forth in claim 1, further comprising
   a data transmission medium connected to said line switching means and having a data transmission capacity enabling transmission of a baseband-frequency digital video signal and
   a baseband-frequency digital video signal recording and reproduction means connected to said line switching means in parallel with said data storage means,
   said baseband-frequency digital video signal recording and reproduction means being controlled in recording and reproduction operation by said control means.

6. A video signal recording and reproduction apparatus as set forth in claim 1, further comprising a decoding means connected to said line switching means and decoding the video signal data reproduced by said data storage means.

7. A video signal recording and reproduction apparatus as set forth in claim 1, wherein said control means controls said line switching means, a first one of said data storage means and a second one of said data storage means so that video data is transferred between said first one of said data storage means and said second one of said data storage means according to a reference synchronization signal.

8. A video signal recording and reproduction apparatus as set forth in claim 7, wherein said control means controls the recording and reproduction apparatus of said first and second data storage means so that the video signal is transferred between said data storage means at a speed less than the maximum data transfer speed of said line switching means and less than the maximum data transfer speed of said data storage means.

9. A video signal recording and reproduction apparatus as set forth in claim 1, wherein signals are transferred between processing units within said control means via a signal line located within said control means.

10. A video signal recording and reproduction apparatus as set forth in claim 1, wherein said control means is provided with a synchronous system control execution means for executing control over at least said data storage means and line switching means in synchronization with a reference synchronization signal and a control instruction transfer means for transferring a control instruction issued from a host application system to said synchronous system control execution means.

11. A video signal recording and reproduction apparatus comprising:

at least one video signal encoding means with a variable encoding efficiency and able to input a video signal in synchronization with a reference synchronization signal;

at least one video signal decoding means able to output a decoded video signal in synchronization with a reference synchronization signal corresponding to said video signal encoding means;

at least one data storage means able to record and reproduce data of a maximum output data speed of said video signal encoding means in synchronization with a reference synchronization signal and able to be changed in speed of recording and reproduction;

a line switching means able to connect a plurality of data transmission media and switch lines in synchronization with a reference synchronization signal;

a synchronous system control execution means able to execute control of at least said video signal encoding means, said data storage means, and line switching means; and a control instruction transfer means able to transfer control instructions issued from a host application system in synchronization with a reference synchronization signal to said synchronous system control execution means;

when recording a video signal, the control instruction transfer means transferring a recording control instruction issued from the host application system to the synchronous system control execution means, and the synchronous system control execution means following the transferred instruction and setting the encoding degree of the video signal encoding means and setting the line connecting the video signal encoding means and data storage means under the control of the line switching means, then referring to the reference synchronization signal and controlling the data storage means to record in the data storage means the encoded video data transmitted by the set line; and when reproducing a video signal, the control instruction transfer means transferring a reproduction control instruction issued from the host application system to the synchronous system control execution means, and the synchronous system control execution means following the transferred instruction and setting the line connecting the data storage means and the video signal decoding means under the control of the line switching means, then referring to the reference synchronization signal and controlling the data storage means to reproduce the stored encoded video data, transmitting it to the video signal decoding means using the set line, and outputting the video signal restored by the video signal decoding means in synchronization with the reference synchronization signal.

12. A video signal recording and reproduction apparatus as set forth in claim 11, wherein when recording a video signal, the control instruction transfer means successively transfers a plurality of independent recording control instructions issued from the host application system to the synchronous system control execution means, and the synchronous system control execution means sets, for each of the transferred plurality of independent instructions in parallel and independently, the encoding efficiency of the video signal encoding means and sets a plurality of lines connecting the video signal encoding means and data storage means under the control of the line switching means, then refers to the reference synchronization signal and controls the data storage means to record in the data storage means the encoded video data transmitted by the set lines; and when reproducing a video signal, the control instruction transfer means transferring a plurality of independent reproduction control instructions issued from the host application system to the synchronous system control execution means, and the synchronous system control execution means sets, for each of the transferred plurality of independent instructions successively and independently, the line connecting the data storage means and the video signal decoding means under the control of the line switching means, then refers to the reference synchronization signal and controls the data storage means to reproduce the stored encoded video data, transmits it to the video signal decoding means using the set lines, and outputs the video signal restored by the video signal decoding means in synchronization with the reference synchronization signal.

13. A video signal recording and reproduction apparatus as set forth in claim 11, wherein the control instruction transfer means transfers an instruction for data transfer between data storage means issued from the host application system to the synchronous system control execution means, and the synchronous system control execution means follows the transferred instruction and sets the line connecting the transmitting side data storage means and receiving side data storage means under the control of the line switching means, then refers to the reference synchronization signal and controls the two data storage means to transfer the encoded data between the data storage means by the set line at any speed below the data transmission speed of the set line and below the data recording and reproduction speed of the data storage means.

14. A video signal recording and reproduction apparatus as set forth in claim 11, wherein when recording and reproducing a video signal, the control instruction transfer means transfers a line setting instruction for control signals in the lower system, issued from the host application system, to the synchronous system control execution means, the synchronous system control execution means follows the transferred instruction and sets the control signal line connecting any desired devices in the synchronous system control execution means, and control signals are transferred between the devices in the lower system through the set control signal line.

15. A video signal recording and reproduction apparatus as set forth in claim 11, wherein provision is made of a data transmission medium connected to said line switching means and having a data transmission capacity enabling transmission of a baseband-frequency digital video signal, said line switching means has connected to it a video signal recording and reproduction means able to record and reproduce a baseband-frequency digital video signal in synchronization with a reference synchronization signal in parallel with said data storage means, and said synchronous system control execution means controls the video signal recording and reproduction means and line switching means to record and reproduce the baseband-frequency digital video signal.

* * * * *